US006639745B1

(12) United States Patent
Cheng

(10) Patent No.: US 6,639,745 B1
(45) Date of Patent: Oct. 28, 2003

(54) OBSERVATION WINDOW OF A HYPERBARIC CHAMBER

(76) Inventor: Kuo-Chung Cheng, No. 9, Lane 12, Guang Feng 1st Street, Ba-De City, Tao Yuan County (TW)

( * ) Notice: Subject to any disclaimer, the term of this patent is extended or adjusted under 35 U.S.C. 154(b) by 0 days.

(21) Appl. No.: 10/178,463

(22) Filed: Jun. 25, 2002

(51) Int. Cl.⁷ .......................... G02B 27/00; G02B 5/00; G02B 7/00
(52) U.S. Cl. .......................... 359/894; 359/609; 73/323; 73/330; 73/334; 220/663
(58) Field of Search .................................. 359/894, 895, 359/609; 73/325, 326, 323, 330, 334; 222/158; 220/663; 52/308

(56) References Cited

U.S. PATENT DOCUMENTS 4,986,636 A * 1/1991 Contzen ..................... 359/894

6,359,742 B1 * 3/2002 Canty ........................ 359/894
2002/0100812 A1 * 8/2002 Sudo ......................... 236/92 B

* cited by examiner

*Primary Examiner*—John Juba
*Assistant Examiner*—Leo Boutsikaris
(74) *Attorney, Agent, or Firm*—Rosenberg, Klein & Lee

(57) ABSTRACT

An observation window of a hyperbaric oxygen chamber includes a frame, and a transparent member. The frame is fixedly joined to a wall of the chamber. The frame includes an outer annular connecting portion, and an inner annular holding portion, which is encircled by the outer portion, and which defines a central observation hole; an annular space is formed between the connecting portion and the holding portion to help reduce effects of deformation of the connecting portion on the holding portion so that the transparent member can still be fitted into the holding portion with precision after solder welding is used to secure the frame in position. An O-shaped ring is fitted between the transparent member and the holding portion to prevent compressed gas inside the chamber from leaking and to prevent the transparent member from falling off the frame.

3 Claims, 5 Drawing Sheets

OBSERVATION WINDOW OF A HYPERBARIC CHAMBER

BACKGROUND OF THE INVENTION

The present invention relate to all observation window of a hyperbaric chamber, and more particularly to an observation window, which has a frame less likely to be deformed due to high temperature caused by solder welding, and which is constructed in such a manner as to provide the users with widened view angle.

Hyperbaric oxygen chambers have been provided to treat divers with the bends, a serious illness caused by ascending from deep water too fast. This treatment overcomes oxygen starvation in the tissues, by flooding the body's fluids with life-giving oxygen. Hyperbaric oxygen treatment has many other applications now, including treatment of a variety of illnesses and revitalization of athletes.

Referring to FIGS. 4 and 5, a conventional observation window 2 of a hyperbaric chamber includes a frame 22, a transparent member 24, and a securing member 26 having a central hole 261. The frame 22 is secured to a holed portion 21 of the hyperbaric chamber by means of solder welding; the chamber is usually made of strengthened metal so that it can stand high air pressure inside. The frame 22 has a central observation hole 221, a holding room 23, and several bolt holes around the holding room 23. A first ringed leak-prevention pad 242 is disposed in the holding room 23. The transparent member 24 is fitted into the holding room 23. A second ringed leak-prevention pad 241 is disposed on the transparent member 24. And, the securing member 26 is disposed on the outer side of the transparent member 24, and is joined to the frame 22 with bolts 25 screwed through connecting holes thereof as well as the bolt holes of the frame 22. Thus, the transparent member 24 is secured to the frame 22 without possibility of falling off, and the pads 241, 242 are tightly pressed against it to prevent leakage of gas through the joints.

Thus, the persons delivering the service with the chamber can observe the customers who are sitting in the chamber with hyberbaric oxygen provided therein. However, the observation window is found to have disadvantages as followings:

1. Annular slopes are usually formed around the outer side of die frame 22 and around the hole of the chamber so that a relatively big space is formed between the frame 22 and the chamber. So, solder can be added to the space in more amount when solder welding is used to join the frame 22 and the chamber together. Consequently, the welding process would take relatively long time, and produce a lot of heat that would cause deformation of the frame 22 that will hinder the tight connection of the transparent member 24 to the holding room 23, and make leakage likely to happen.
2. The securing member 26 will cause the view angle of the observation window to become smaller, hindering proper observation of the customers.

SUMMARY OF THE INVENTION

Therefore, it is a main object of the present invention to provide an observation window which has a frame less likely to be deformed due to high temperature caused by solder welding.

It is another object of the present invention to provide an observation window which is constricted in such a manner as to provide the users with widener view angle.

The observation window includes a frame, and a transparent member. The frame is fixedly joined to the chamber wall. The frame includes an outer annular connecting portion, and an inner annular holding portion that defines a central observation hole, and defines an annular space with the connecting portion. The annular space helps reduce effects of deformation of the connecting portion on the holding portion that is caused by high temperature of solder welding used to join the frame to the chamber wall. An O-shaped ring is fitted between the transparent member and the holding portion to prevent the transparent member from falling off the frame instead the conventional securing member that will narrow the view angle.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
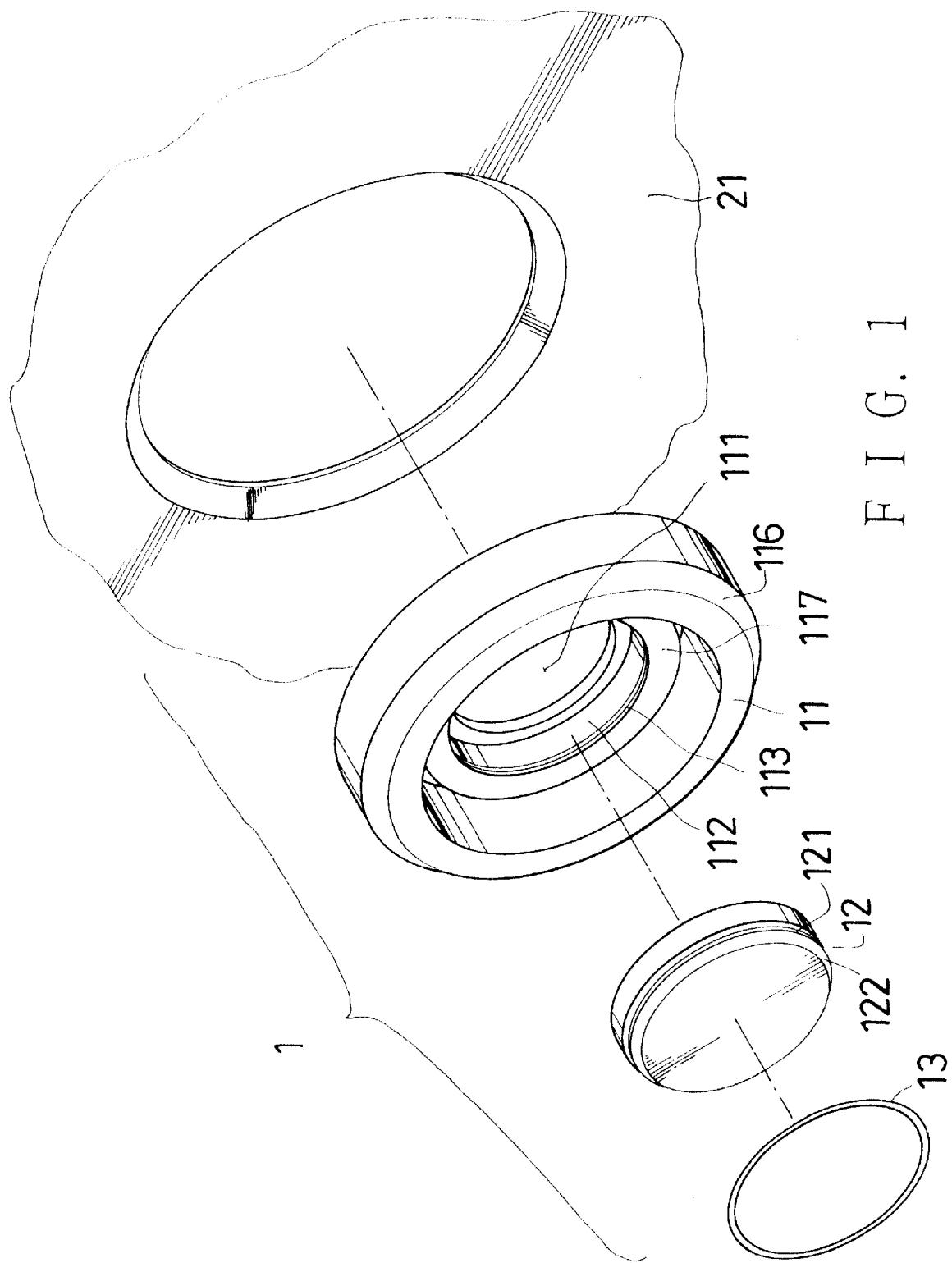
FIG. 1 is an exploded perspective view of the observation window for hyperbaric chamber according to the present invention.
Figure 2:
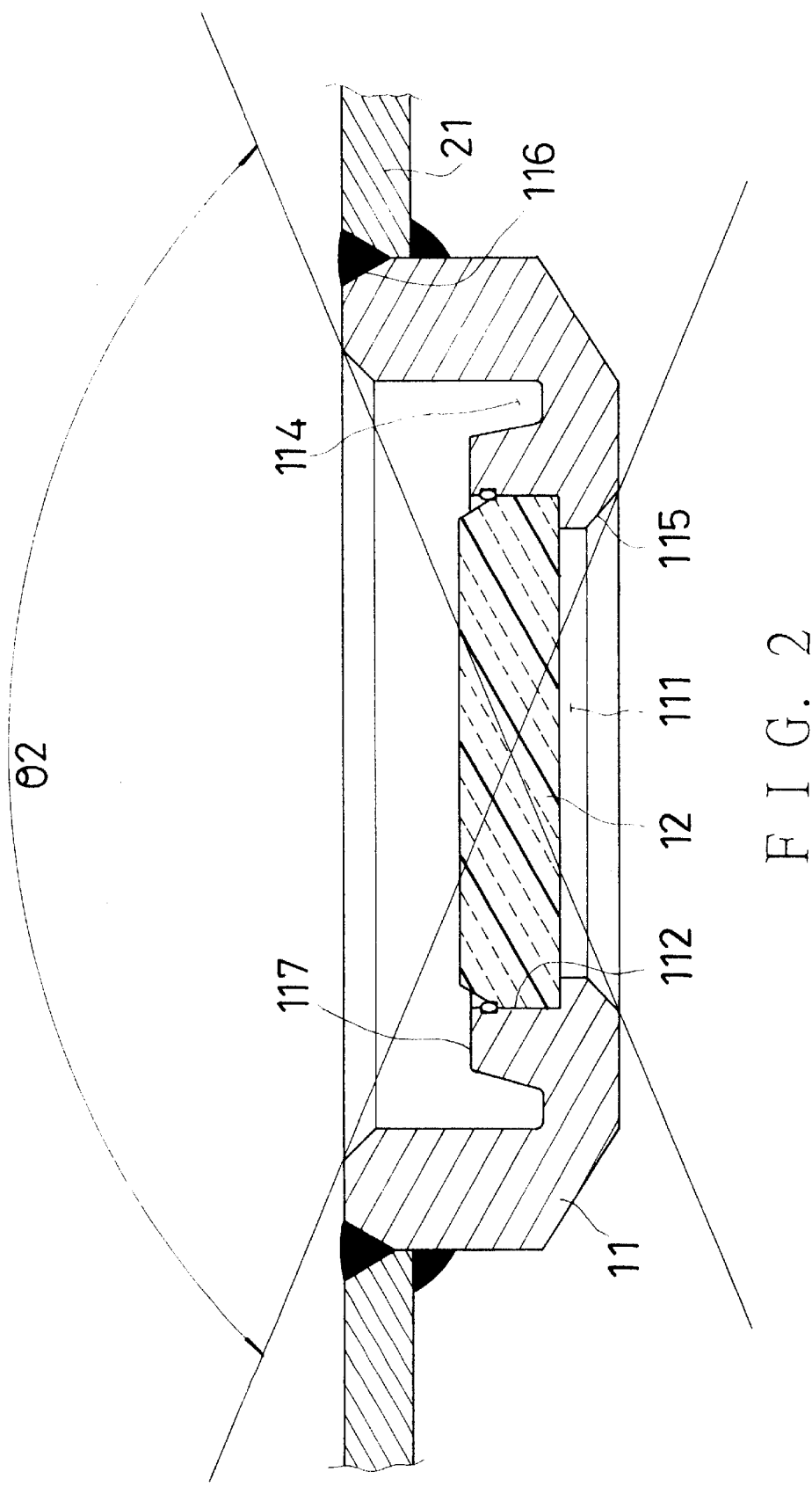
FIG. 2 is a cross-sectional view of the observation window of the present invention.
Figure 3:
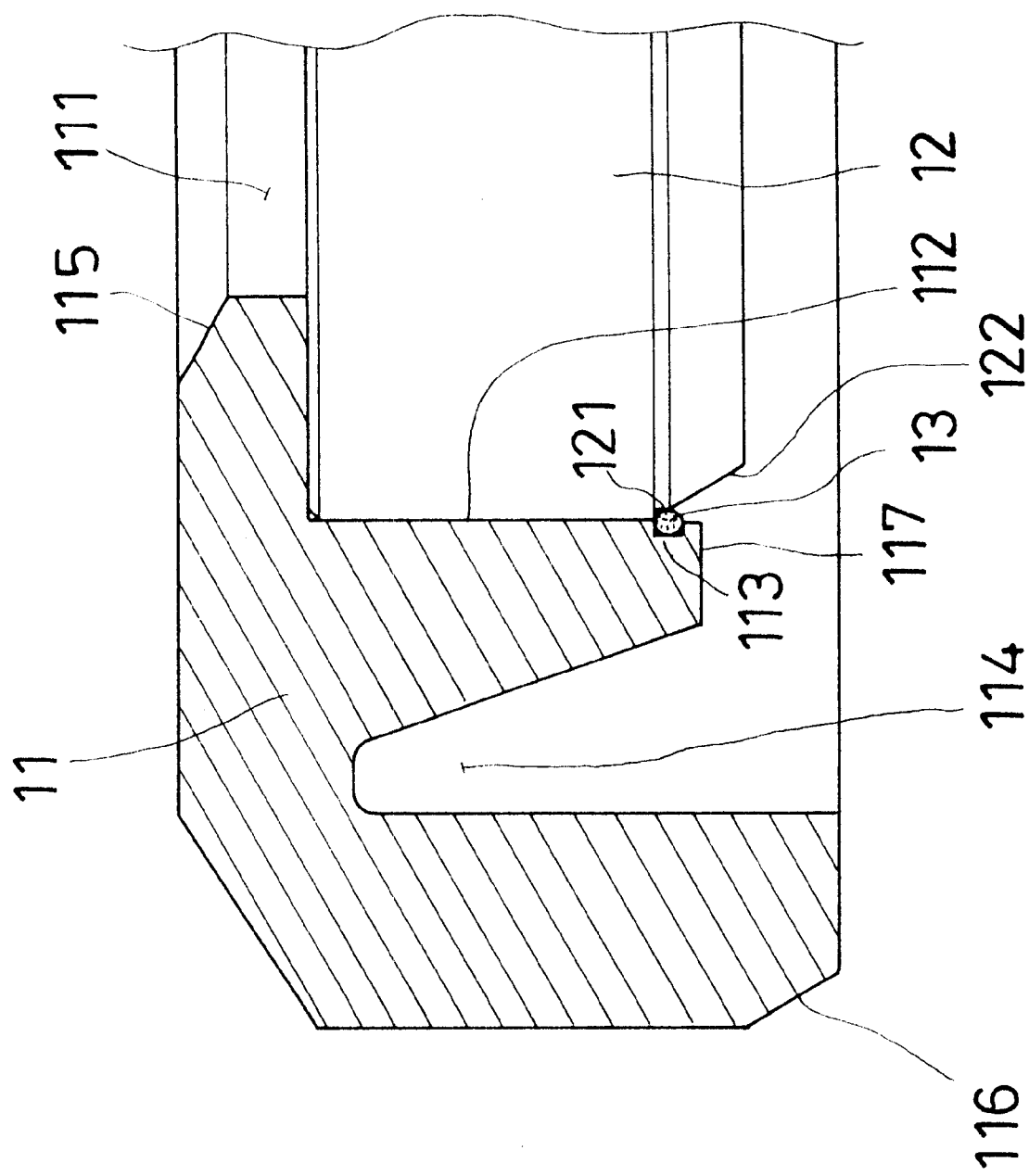
FIG. 3 is a partial cross-sectional view of the observation window of the present invention.
Figure 4:
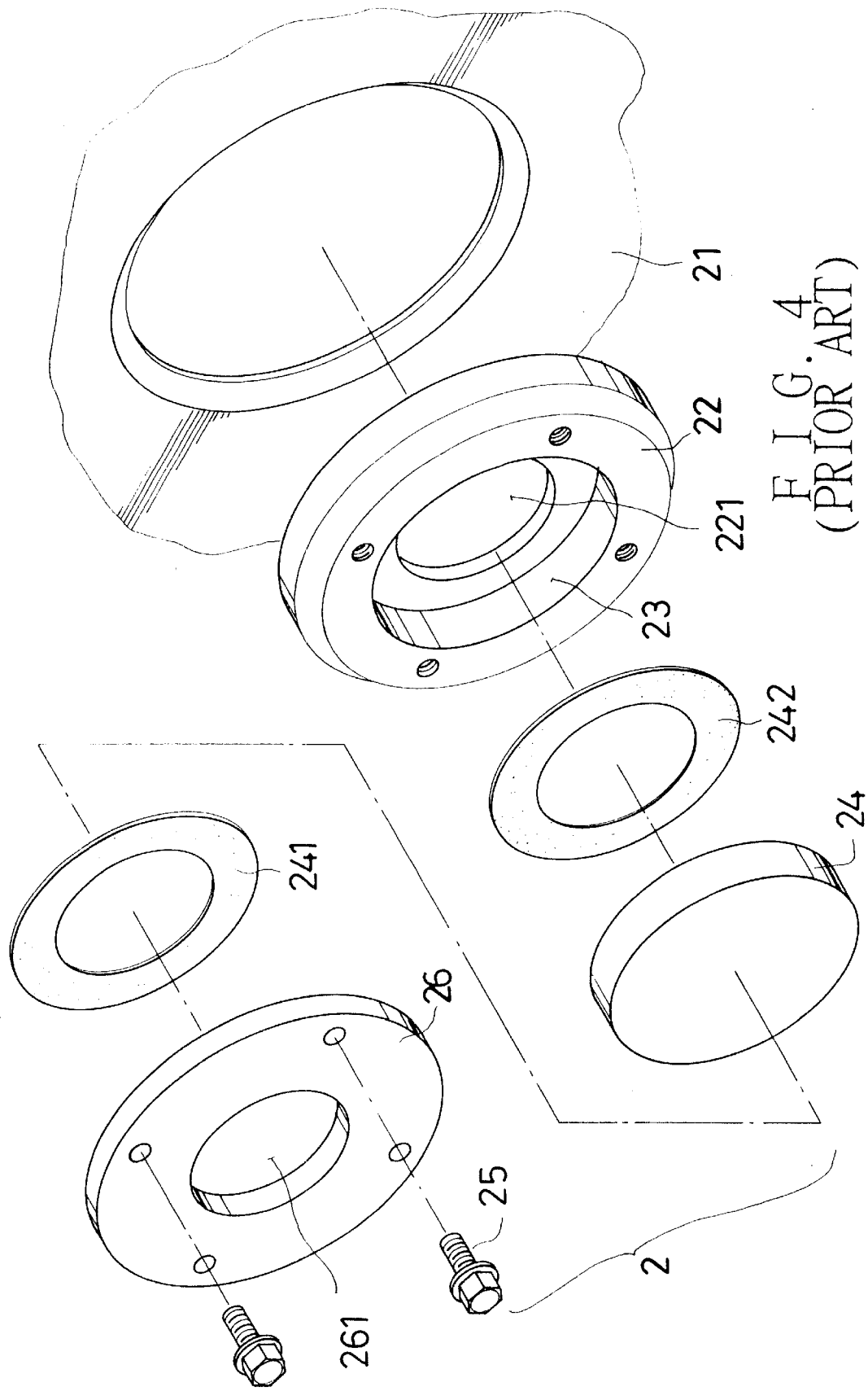
FIG. 4 is an exploded perspective view of the conventional observation window for hyperbaric chamber.

Referring to FIGS. 1 and 2, an observation window of a hyperbaric oxygen chamber according to the present invention includes a frame 1, a transparent member 12, and an O-shaped leak-prevention ring 13. The chamber has a wall 21 having a hole formed thereon. And, the hole has an annular slope (not numbered) on the outer side of the edge thereof.

The frame 11 has a central observation hole 111 an outer annular connecting portion, and an inner annular holding portion, which is encircled by the outer connecting portion, and which defines a holding room 112. The frame 11 has an annular slope 116 on an outer side of an outward end thereof (The "outward end" means the end that faces the same direction as the outer side of the chamber wall 21 when the frame 11 is connected to the chamber wall 21.). An annular space 114 is formed between the outer annular connecting portion and an outward section of the inner annular holding portion of the frame 11 for reducing effects of deformation of the outer annular connecting portion on the inner holding portion.

The outer annular connecting portion of the frame 11 is tightly fitted into the hole of the chamber wall 21 with the annular slopes facing each other to form an annular groove; melted solder is applied onto the annular groove as well as a joint between the frame 11 and the inner side of the chamber wall 21 so that the frame 11 is firmly joined to the chamber wall 21 as shown in FIG. 2.

Furthermore, the holding portion 112 of the frame 11 has an annular trench 113 on an outward end of an inner side thereof The transparent member 12 has an annular slope 122 on an outer side of an outward end thereof, and an annular recess 121 that is formed adjacent to an inner end of the annular slope 122 on the outer side.

In combination, the transparent member 12 is closely fitted into the holding room 112 of the frame 11 with the annular recess 121 facing the annular trench 113 of the inner holding portion of the frame 11. And, the O-shaped leak-prevention ring 13 is fitted onto both the annular recess 121 and the annular trench 113 to prevent the transparent member 12 from falling off the frame 11, and to prevent gas from traveling through the joint between the transparent member 12 and the frame 11.

When the chamber is filled with compressed gas having relatively high percentage of oxygen, the transparent member 12 will be pressed outwardly of the frame 11 by the gas inside the chamber so that the leak-prevention ring 13 is forced to come into contact both the frame 11 and the transparent member 12 with increased force, preventing gas from leaking effectively. And, the persons delivering the service can observe the customers seated in the hyperbaric oxygen chamber through the observation window.

In addition, referring to FIG. 2 again, the inner annular holding portion of the frame 11 is provided with an annular slope 115 on an inner side of the inward end so that the view angle of the observation window is widened.

The distance from an outward end 117 of the inner annular holding portion to the outward end of the outer annular connecting portion of the frame 11 is preferably at least one half of the length of the outer annular connecting portion so as to allow an effective reduction of the effects of deformation of the outer annular connecting portion on the inner holding portion, which deformation is caused by high temperature of the solder welding process.

Figure 5:
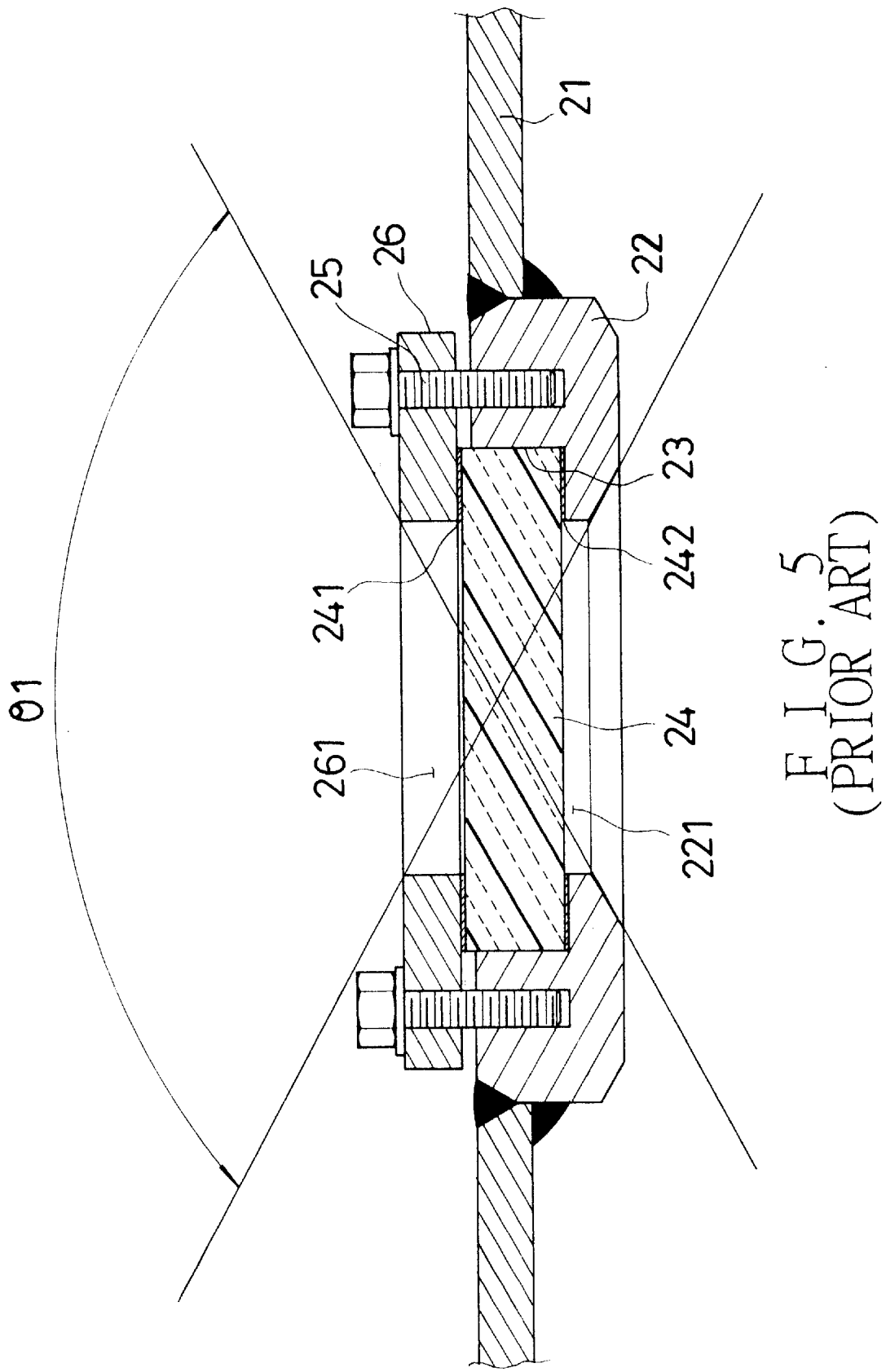
FIG. 5 is a cross-sectional view of the conventional observation window for hyperbaric chamber.

From the above description, it can be easily understood that the present observation window of a hyperbaric oxygen chamber has advantages as followings:

1. The annular space 114 can help reduce effects of deformation of the outer annular connecting portion on the inner holding portion that is caused by high temperature of the solder welding so that the transparent member 12 can be fitted into the inner holding portion with precision even after the solder welding.
2. The distance from the outward end 117 of the inner annular holding portion to the outward end of the outer annular connecting portion of the frame 11 is so long as to be able to effectively reduce the effects of deformation of the outer annular connecting portion on the inner holding portion.
3. The present transparent member 12 is secured in position with the O-shaped ring instead of the conventional securing member, therefore the problem of the view angle being narrowed by a conventional securing member is eliminated, as can be seen when comparing the view angle in FIG. 2 with that in FIG. 5.
4. The leak-prevention ring 13 is forced to come into contact with both the frame 11 and the transparent member 12 with increased force when the chamber is used; thus, it can prevent gas from leaking effectively without use of conventional leak-prevention pads.

What is claimed is:

1. An observation window of a hyperbaric oxygen chamber, comprising a frame having an annular holding portion defining a central observation hole; the frame being joined to a wall of the chamber by means of solder welding with the central observation hole being aligned with a hole of the wall; the holding portion having an annular trench on an inner side of an outward end thereof;

a transparent member having an annular slope on an outer side of one end thereof, and an annular recess formed adjacent to an inner end of the annular slope on an outer side thereof;

the transparent member being closely fitted into the holding portion with the annular recess being faced with the annular trench of the holding portion, and with an O-shaped ring being fitted between the annular recess and the annular trench to prevent gas from traveling through a joint between the transparent member and the frame plus to prevent the transparent member from falling off the frame.

2. An observation window of a hyperbaric oxygen chamber, comprising a frame having an outer annular connecting portion, and an inner annular holding portion encircled by and axially recessed relative to the outer annular connecting portion, the inner annular holding portion defining a central observation hole; the frame being joined to a wall of the chamber at the outer annular connecting portion thereof by means of solder welding with the central observation hole being aligned with a hole of the wall;

a transparent member closely fitted into the inner annular holding portion of the frame;

an annular space being formed to extend radially between the outer annular connecting portion and the inner annular holding portion of the frame for reducing effects of deformation of the outer annular connecting portion on the inner holding portion that is caused by high temperature of the solder welding used to join the outer annular portion to the chamber wall, thus helping the transparent member inserted into the inner holding portion after the solder welding.

3. The observation window of a hyperbaric oxygen chamber according to claim 1, wherein a distance from an outward side of the inner annular holding portion to an outward side of the outer annular connecting portion of the frame is at least one half of a length of the outer annular connecting portion.

* * * * *